United States Patent
Christenson et al.

(10) Patent No.: US 6,324,620 B1
(45) Date of Patent: Nov. 27, 2001

(54) DYNAMIC DASD DATA MANAGEMENT AND PARTITIONING BASED ON ACCESS FREQUENCY UTILIZATION AND CAPACITY

(75) Inventors: Patrick James Christenson; Michael Joseph Corrigan; Thomas Richard Crowley; Michael Steven Faunce, all of Rochester; Michael James McDermott, Oronoco; Timothy John Mullins, Rochester; Glen Warren Nelson, Rochester; Russell Paul VanDuine, Rochester; Bruce Marshall Walk, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,449

(22) Filed: Jul. 23, 1998

(51) Int. Cl.⁷ ..................................................... G06F 12/00
(52) U.S. Cl. ........................... 711/112; 711/122; 711/117; 710/74
(58) Field of Search .......................... 707/205; 711/112, 711/122, 117; 375/341; 710/74; 712/37; 705/1

(56) References Cited

U.S. PATENT DOCUMENTS

| | | | | |
|---|---|---|---|---|
| 4,310,883 | * | 1/1982 | Clifton et al. | 707/205 |
| 4,466,059 | * | 8/1984 | Bastian et al. | 711/122 |
| 5,574,881 | * | 11/1996 | Yasuoka et al. | 711/112 |
| 5,619,539 | * | 4/1997 | Coker et al. | 375/341 |
| 5,732,215 | * | 3/1998 | Boutaghou et al. | 710/74 |
| 5,734,922 | * | 3/1998 | Hagersten et al. | 712/37 |
| 6,012,032 | * | 1/2000 | Donovan et al. | 705/1 |
| 6,032,224 | * | 2/2000 | Blumenau | 711/117 |
| 6,108,749 | * | 8/2000 | White et al. | 711/112 |

* cited by examiner

*Primary Examiner*—Matthew Smith
*Assistant Examiner*—Jibreel Speight
(74) *Attorney, Agent, or Firm*—Wood, Herron & Evans

(57) ABSTRACT

Method and apparatus for managing data on DASD units to improve system performance comprises monitoring portions of data on a plurality of DASD units to determine the times the data is accessed within a given time period, and characterizing accessed data portions of a DASD unit as HOT and COLD data. The DASD units are monitored to determine the number of times each unit is accessed within a time period to develop utilization factors reflective of the number of times the DASD unit is accessed during the time period. HOT and COLD data is moved between DASD units based on the utilization factors of the DASD units.

50 Claims, 7 Drawing Sheets

DYNAMIC DASD DATA MANAGEMENT AND PARTITIONING BASED ON ACCESS FREQUENCY UTILIZATION AND CAPACITY

BACKGROUND OF THE INVENTION

Computer technology continues to be improved to handle more complex functioning associated with specific applications. However, despite the continual advances in the speed and power of computers and their associated support devices, these new applications of computer technology continue to demand even greater computing power. For this reason, an ever-present need exists for improving the performance and speed of the computer hardware and the software that controls how a computer operates.

Generally, the software that controls how the computer operates, in its most basic form, is referred to as the operating system of the computer. The operating system is essentially a set of software programs that manages the various hardware and software resources of the computer and handles the computer's interaction with users. For example, it is the operating system that creates the computer's prompts and screens on the monitor to interface with a user and that runs the computer's programs for the user. Furthermore, the operating system will allow a computer to interface with its hardware resources, such as a printer or a disk drive, or will allow a user to run other higher level software applications on the computer such as Microsoft's WINDOWS program. The operating system, therefore, must be able to complete a large number of different functions to ensure that the computer, including its accessible hardware and software resources, functions properly and at a sufficient speed for the user.

Much of the software code and data that is used for a computer operating system, or for higher level applications and programs, may exist in the resident memory of the computer itself. However, for large numbers of applications and large banks of data, the internal memory capacity of the computer may not be adequate. Despite increases in the capacity of the resident computer memory, larger and more complex programs will still exceed the resident memory. Therefore, the computer must rely upon one or more associated mass storage memory devices for additional memory. Such mass storage memory devices may include hard disk drives or floppy disk drives, for example. Such mass storage memory devices are commonly referred to as direct access storage devices, or DASDs, because they are accessed directly by the computer system for obtaining the programs or software stored thereon.

With respect to certain systems and their programs, the DASDs associated with the computer may be accessed frequently. Access to a DASD is referred to as an input/output operation, or I/O operation. Therefore, systems relying heavily upon DASDs are considered to be DASD I/O intensive environments. Since the operation of the system relies upon DASD I/O operations, the efficiency and speed of the system is directly limited by the performance of the DASDs. The time required for the computer to access the various DASDs creates a bottleneck in the system and degrades system performance.

For example, a large capacity DASD unit may contain a significant amount of frequently accessed data which can only be accessed as quickly as the DASD will physically allow. The technological improvements in the memory capacity of DASDs has only increased the bottleneck. The current trend in DASD manufacturing is to double memory capacity every 12 to 18 months. However, despite increases in the size of memory, only a 10% performance increase for the system has resulted in that same 12 to 18 month period. The system performance is mechanically limited by the DASD device and the time it takes to access the device. Poor system performance is then caused by several factors.

First, data is not always balanced among the different DASD units of a system. Those DASD units containing more of the frequently accessed data are over-utilized and become the bottleneck that degrades system performance. Secondly, frequently accessed data may be spread across an entire DASD unit, causing long seek times for the DASD unit to move from one piece of frequently accessed data to another piece of frequently accessed data. Thirdly, requests for data are usually processed at the same priority, regardless of the priority of the requestor and regardless of the importance of the data. Therefore, important requests for important data waits for the access to less important data.

Placement of data across multiple DASD units to achieve optimal performance is a difficult problem. A system may leave such a task to the system user; however, that results in a very skilled labor-intensive scenario that is very costly to achieve.

It has been proposed to allocate new data to the DASD unit with the greatest percentage of available free space. Such a process is directed to making all the DASD units full at approximately the same time. This provides reasonable data management if all the DASD units have the same capacity and performance characteristics and where all the DASD units were in the original system configuration. However, such a solution does not work well when new DASD units are added to the system, where the DASD units are different sizes, or where the DASD units have different performance characteristics.

Therefore, a need exists for a way to relieve the memory bottleneck of a computer system to increase the speed of the system. More specifically, a need exists for automatically managing the data on DASDs and managing its access to increase system speed and efficiency. Such management is desirable without an increase in system costs or system maintenance costs.

SUMMARY OF THE INVENTION

The invention addresses the above-referenced problems and other problems associated with the prior art with a computer system, program product, and method, that dynamically manage data on DASD units to improve system performance. Herein, each direct access storage device or DASD is referred to as a DASD unit for explanatory purposes.

More specifically, in one embodiment of the invention, portions of data on a plurality of DASD units are monitored, and the number of times the portions of data on the DASD units are accessed within a given time period is determined. Based upon the access frequency of the data, the data will be moved and otherwise managed to reduce system bottlenecks. The more frequently accessed portions of the data are characterized as HOT data and the less frequently accessed data portions are characterized as COLD data. The COLD data and HOT data are then dynamically manipulated on the individual DASD units and among the plurality of DASD units within a system for improving system performance.

In accordance with one aspect of the present invention, the DASD units themselves are monitored to determine the number of times that each unit is accessed within a certain time period. Utilization factors are then assigned to the DASD units and the utilization factors reflect the number of times the DASD unit is accessed during the particular time period. HOT and COLD data are then moved between the DASD units based upon the utilization factors of those DASD units. Specifically, data characterized as HOT is moved to a DASD unit with a low utilization factor (COLD unit). Alternatively, the capacities of the DASD units are also determined and COLD data is moved to the DASD units with the most available capacity.

In accordance with another aspect of the present invention, the data is moved on the individual DASD units depending upon its designation as HOT or COLD. Specifically, the DASD units are partitioned to have a HOT partition and a COLD partition, and HOT data is moved to a HOT partition, while COLD data is moved to a COLD partition. Furthermore, a HOT partition formed on a DASD unit may be formed proximate other portions of data on that unit that are frequently accessed (other HOT data), such as parity data. This arrangement decreases the amount of time that is necessary for searching for HOT data on a DASD unit.

In order to prevent the constant movement of data on a DASD unit and among the various DASD units in a system, the characterization of data as HOT or COLD is based upon deviation from an average frequency of access for the data in the system. Furthermore, the characterization of a DASD unit as overutilized (HOT) or underutilized (COLD) is also based upon a deviation from an average utilization factor for the DASD units of the system. More specifically, the invention determines an average utilization factor for the DASD units of the system being monitored. If the utilization factor of a DASD unit exceeds the average utilization factor of the system by an upper threshold amount, the DASD unit is categorized as highly utilized (HOT). However, if the utilization factor is below the average utilization factor of the system by a lower threshold amount, the unit is categorized as underutilized (COLD). Similarly, an average frequency of access within a particular time period is determined for portions of data on a DASD unit. If the frequency of access of the data portion of that DASD unit exceeds the average frequency of access of the DASD units of the system by an upper frequency threshold, then the data is characterized as HOT. However, if the frequency of access of the data portion is below the average frequency of access by a lower frequency threshold, then the data portion is characterized as containing COLD data.

When data is moved between the various DASD units of a system, the utilization factor of a receiving DASD unit is increased, reflective of the data that it receives. Similarly, the utilization factor of a sending unit is decreased by an amount reflective of data that was removed from that unit and sent to another DASD unit. While data may be monitored with the invention to determine whether it is HOT or COLD data, user control may also be utilized whereupon the data is designated as HOT or COLD upon its creation, based upon the type of data that it is.

In accordance with another embodiment for the present invention, the method for managing data on a plurality of DASD units comprises monitoring portions of the data on a plurality of DASD units to determine the number of times those portions of data are accessed within a predetermined time period. After statistics regarding the number of times that the portions of data are accessed, the data which is less frequently accessed may be characterized as COLD data. Specifically, monitoring the portions of data may include the number of I/O operations for the portions of data to determine the number of times the data portions are accessed in a predetermined time period. The less frequently accessed data, such as that data which has not been accessed at all within the predetermined time period is then designated or characterized as COLD data. The individual DASD units and their utilization is also monitored to determine which DASD units are overutilized and which units are underutilized. The COLD data is then moved to DASD units which are overutilized. Preferably, the COLD data will come from an underutilized DASD unit and will be moved to an overutilized DASD unit.

These features and other features of the invention are discussed in greater detail below in the Detailed Description of the Invention which makes reference to the drawings to illustrate embodiments consistent with the invention.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION

Overall Hardware and Software Environment

Figure 1:
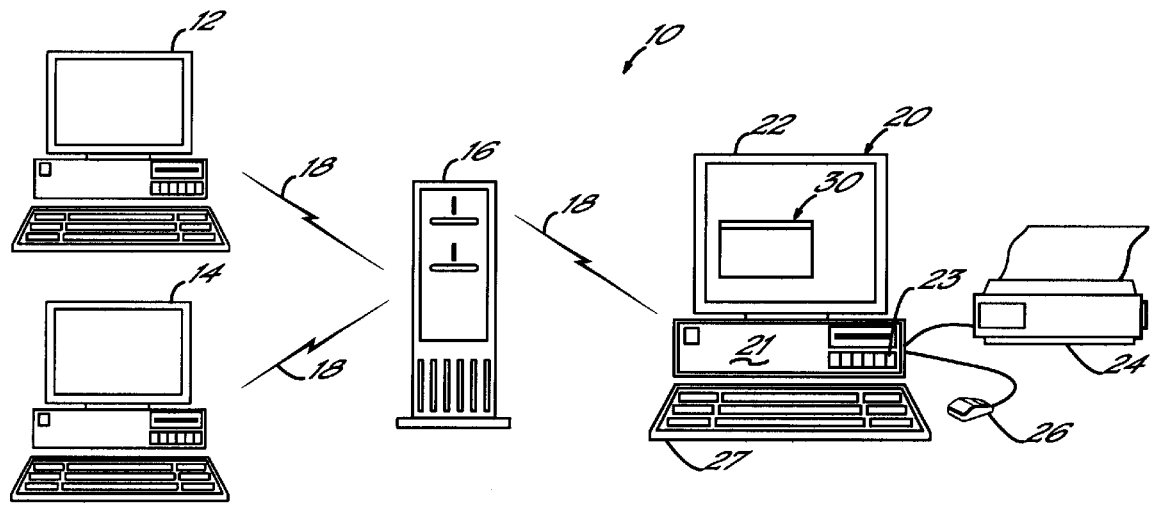
FIG. 1 is a schematic hardware diagram of a network environment consistent with the invention.

Turning to the drawings, wherein like numbers denote like parts throughout the several views, a networked computer system 10 consistent with the invention is illustrated in FIG. 1. Computer system 10 is a networked computer system and includes one or more remote or client computer systems 12, 14 and 20 (e.g., desktop or personal computers, workstations, etc.) which may be associated with a server system 16 (e.g. a PC-based server, a mini computer, a midrange computer, a mainframe computer, etc.) by logical connections or logical links (links) within network 18. The computer systems and the server will all be running various programs which have internal software tasks associated therewith. The links made with server system 16 by devices 12, 13, 20 are made through the network 18. Network 18 and the computer systems thereon may represent practically any type of networked interconnection, including but not limited to local-area networks (LANs), wide-area networks (WANs), wireless, and public networks (e.g., the Internet).

Any number of computers and other user devices may be networked through network 18, e.g., through multiple servers 16.

Computer system 20, which may be similar to computer systems 12, 14, may include one or more central processor units (CPU), such as a microprocessor 21; a number of peripheral components such as a computer display 22 (e.g., a CRT, an LCD display or other display device); direct access storage devices 23 (DASD's) such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment. For example, each of the devices 12, 14, 16, and 20 and respective link stations coupled together through network 18 will execute programs for communicating or "talking" with each other over the network.

In general, the software routines executed to implement the illustrated embodiments of the invention, whether implemented as part of an operating system or a specific application, program, object, module, communications protocol, or sequence of instructions will be referred to herein as "computer programs," or simply, programs. The computer programs typically comprise instructions that are resident at various times in various memory and storage devices in the computer, and that, when read and executed by one or more processors 21 in the devices or systems in networked computer system 10, cause those devices or systems to perform the steps necessary to execute steps or elements embodying the various aspects of the invention.

Figure 2:
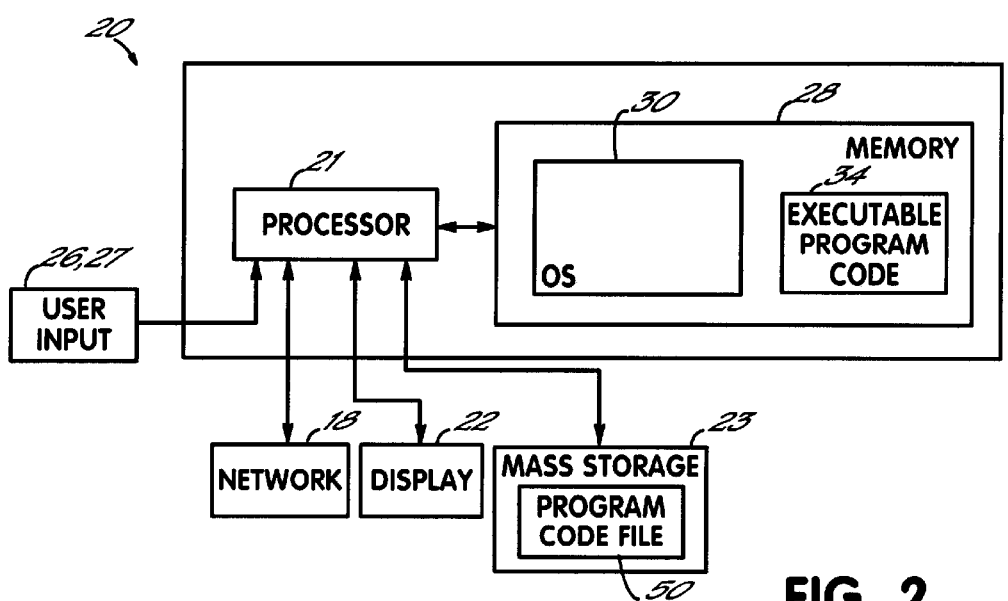
FIG. 2 is a block diagram of a networked device consistent with the invention.

While the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable-type media such as volatile and non-volatile memory devices, floppy and other removable disks, hard disk drives, optical disks (e.g., CD-ROMS, DVD;s, et.) among others, and transmission-type media such as digital and analog communication links. Furthermore, the invention applies regardless of the type of signal-bearing media used to establish the links on the network 18. Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 2 illustrates one suitable software environment for the managing waiting tasks consistent with the invention. A processor 21 is illustrated as coupled to a memory 28 as well as to several inputs and outputs. Processor 21 may represent one or more processors and memory 28 may represent the random access memory (RAM) devices comprising main storage of a computer system 20, as well as other memory (e.g., cache memories, nonvolatile or back-up memories, such as programmable or flash memories, and read-only memories, etc.) In addition, memory 28 may be considered to include memory storage physically located elsewhere in computer 20, e.g., any cache memory in processor 21, as well as any storage capacity used as a virtual memory, e.g., as stored on a mass storage device 23 or on another computer coupled to computer 20 via a network 18. For example, user input is received by processor 21, by mouse 26 and keyboard 27, among others. Additional information may be passed between computer system 20 and other computer systems or link stations in networked computer system 10 via the network 18. Additional information may be stored to and/or received from mass storage 23. Processor 21 also outputs display data to an output device such as display 22. It should be appreciated that computer system 20 includes suitable analog and digital interfaces between processor 21 and each of components 18, 22, 23, 26, 27 and 28, as is well known in the art. An operating system 30 is illustrated as resident in memory 28, and is configured to execute program code on processor 21 (e.g., executable program code 34), as well as to retrieve program code such as program code file 50 from mass storage 23 and/or from network 18, among other operations. The computer 20, under control of operating system 30 executes various software applications, components, programs, objects, modules, etc. Furthermore, various such software applications, etc. may be executed on one or more processor in another computer coupled to computer 20 via a network in a distributed or client-server computing environment. The mass storage device may be a direct access storage device (DASD), such as a hard disk, for example. Furthermore, it should be appreciated that any of the operating system code 30, executable program code 34, and program code file 50 may, at different times, be resident in whole or in part in any of memory 28, mass storage 23, network 18, or within registers and/or caches in processor 21.

It should be appreciated that other software environments may be utilized in the alternative.

DASD Partitioning

In accordance with the aspects of the present invention, the DASD data management determines the frequency of access of the data on a DASD unit and moves the data on the DASD unit or among DASD units based on the data's access frequency. DASD partitioning divides each DASD unit of the system into a smaller HOT partition containing frequently accessed data (Hot Data) and a larger COLD partition containing infrequently accessed data (Cold Data). For the partitioning, the HOT and COLD data are identified and are placed appropriately in the HOT and COLD partitions of the DASD units in the system. New data added to the DASD units is also similarly identified and partitioned. The HOT and COLD data are moved appropriately between DASD units based upon the utilization of those units, their capacity, and how frequently the data is accessed (i.e., whether it is HOT or COLD data. Accordingly, the HOT and COLD partitions of the various DASD units are adjusted in size to handle the HOT and COLD data allocated thereto. Furthermore, thresholds are utilized in order to allow partitioning and data movement, but to reduce and prevent data thrashing between the DASD units which may occur when the data is constantly moved back and forth between DASD units. It will be appreciated by a person of ordinary skill in the art that the various flowchart steps or blocks in the Figures do not necessarily have to be executed in the order shown, as long as the various steps of a particular process are handled. For example, the Utilization process flowchart shows a step of determining if a DASD unit exceeds the average access to see if it is over-utilized and then to see if it is under-utilized. The steps may be reversed to first determine if it is underutilized and then, subsequently, over-utilized, for example.

Data Identification

To that end, the data stored on the DASD units must be identified as either HOT data, COLD data, or neither. As will be appreciated, not all data will be HOT or COLD. HOT data will be considered data that is accessed more frequently than the average data, whereas COLD data will be considered to be data which is accessed less frequently with respect to the average data on a DASD unit. As discussed further hereinbelow, the partitioning and movement of the data in the invention is dependent upon how frequently each DASD unit itself is accessed or utilized for all data, which will be referred to as a Utilization Factor (UF), and how frequently or infrequently various portions of data on a specific DASD unit are accessed. The various portions of data on a DASD unit are, for the purposes of illustrating the invention, considered to be certain areas on the actual physical hard disk. As mentioned, a Direct Access Storage Device, of DASD, may be any number of different devices in addition to a hard disk and, therefore, partitioning data based upon areas of a disk may not be appropriate for all DASD forms. However, for the purposes of illustrating the present invention herein, the DASD units will be assumed to be hard disk drive units with physical disks which may be divided into various areas or data portions. Generally, disk drives will include an arm which moves over the disks and locates and accesses the various data portions. Accordingly, the data portions might be defined by arm movement, for example. In any case, certain portions of the data will be analyzed to determine how frequently they are accessed and to therefore determine where they should be positioned on a DASD unit in accordance with the various aspects of the present invention.

Figure 3A:
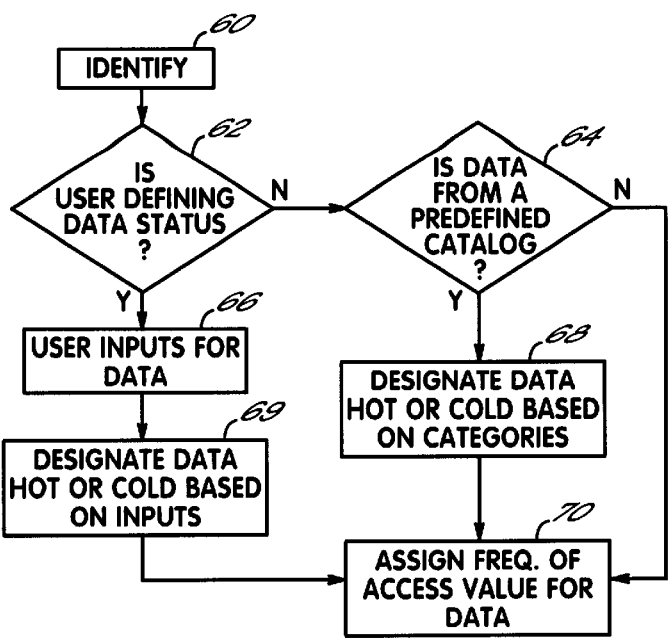
FIGS. 3A and 3B are schematic flowcharts of features of the present invention.

As mentioned, identification of data will be determined by how frequently the data is accessed. Referring to FIG. 3A, the Identify process, indicated generally by block 60, determines how new DASD data is designated by a user when created. To that end, a determination is made whether the user or creator of the data is defining the data status (block 62). For example, data used for indexes may be known by the user to be data which is frequently accessed over a long period of time. Accordingly, the index data may be designated by the user as HOT data. If the user defines the data as indicated by a YES to decision block 62, the user inputs for the data are read (block 66) and the data is designated HOT or COLD based upon those inputs (block 70).

If the data is not defined at creation, the data may be categorized as HOT or COLD based upon its type. For example, data used to create stacks and temporary work areas is frequently accessed for short periods of time. Other data types may also be frequently or infrequently accessed. Accordingly, the data may be from a predefined category and a test is made, according to block 64, to determine if the data is from a predefined category. If it is, the data is designated HOT or COLD based upon the category (block 68). If it is not, the data is partitioned at execution time by counting actual accesses to the data over time. That is, DASD partitioning in accordance with the principles of the invention identifies HOT and COLD data by determining the number of accesses to that data portion on the DASD over a particular time period.

Once the new data is defined or categorized, if applicable, it is assigned a frequency of access value based on the type of data (block 69). For example, the frequency of access value for defined HOT or COLD data may be assigned. If the data is not user defined or categorized (NO from box 64), the data might be assigned a default value which could be any value, including zero (0).

Figure 3B:
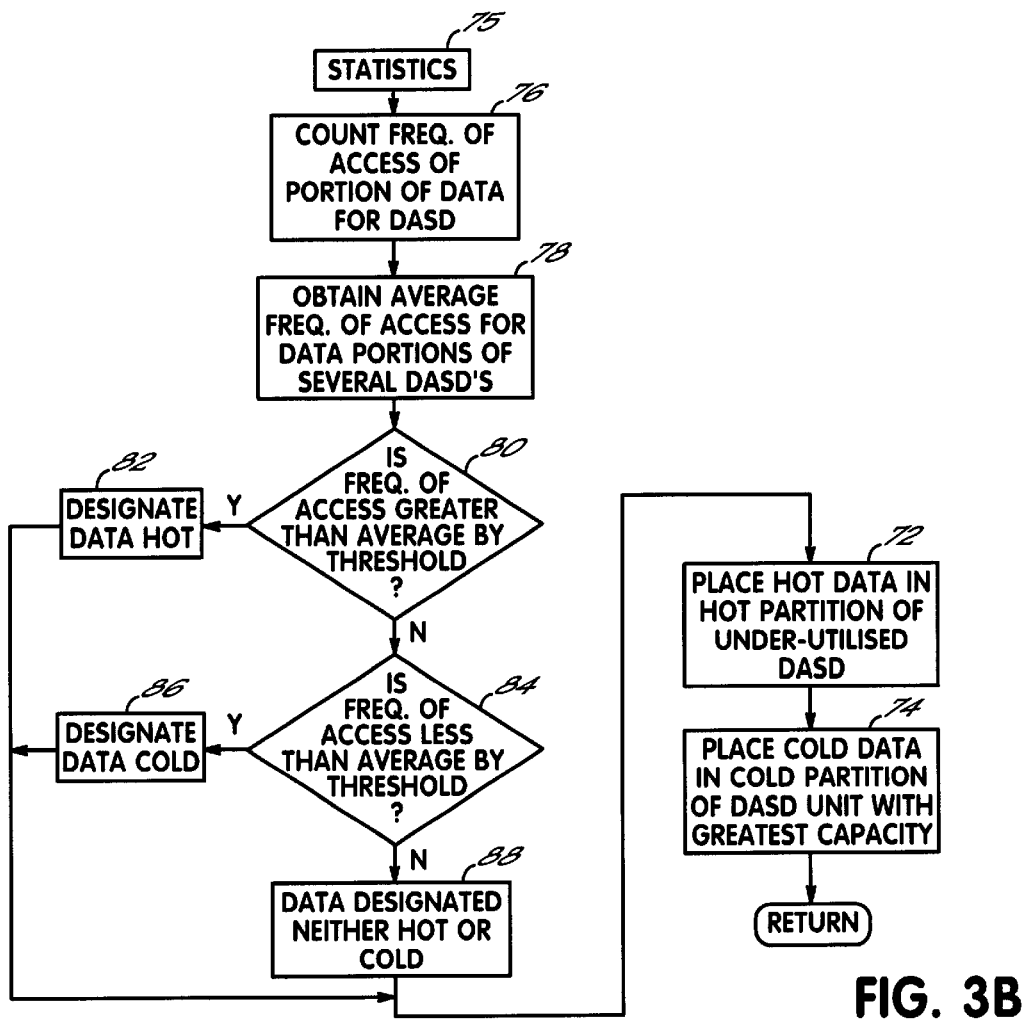

For data that currently exists and is not newly created, statistics are gathered (block 75) and the frequency of access to the portion of the data for a DASD unit is counted over time (block 76). See FIG. 3B. An average frequency of access is then determined for the various data portions of the DASD or for the various data portions over several DASDs (block 78). As noted above, the portions of data may be defined on a DASD unit, such as hard disk, by the distance of movement of the arm which accesses the data on the disk. A threshold amount is then determined for identifying the data portion based upon how far above or below the average frequency of access the data portion must be before it is designated as HOT or COLD. In one scenario, the identification threshold could be application dependent, and could be set by a user. In another scenario, the threshold could be hard coded or maybe set upon installation for the entire system, rather than per application. As discussed further hereinbelow, defining HOT and COLD data based upon a threshold above or below an average frequency of access will reduce and prevent data thrashing, which is defined as constant movement of the data back and forth between the HOT and COLD partitions of the various DASD units.

Once the average frequency of access is determined, the frequency of access of a particular data portion is compared to that average, and if the frequency of access is greater than the average by an identification threshold (block 80) then the data portion is designated as HOT data (block 82). If it is not, then a test is made to determine whether the frequency of access for the particular data portion is less than the average by an identification threshold amount (block 84). If it is, it is designated as COLD data (block 86). However, if it is not, which indicates that it is neither above the average frequency of access by an identification threshold, or below the frequency of access by an identification threshold, then it is generally data that is accessed on a relatively average basis. Therefore, the data is not designated either HOT or COLD (block 88). The identification thresholds may be the same or they may be different. For example, there could be a HOT identification threshold which is a different amount from the average than a COLD identification threshold. Generally, it will not be desirable to designate all data as HOT or COLD because large portions of data may be accessed on a relatively average basis. Accordingly, it will not be desirable to move that average data around constantly, because the average accessed data usually will not be the cause of a DASD access bottleneck in the system. In accordance with one aspect of the invention, it is desirable to designate the HOT data for partitioning to prevent system bottlenecks, and to designate very infrequently accessed data as COLD data so that it may be stored appropriately and further reduce the bottleneck. Once the data portion has been designated HOT or COLD, either by the user, by a predefined category, or by determining the frequency of access at execution, the HOT data is then placed in the HOT partition of an underutilized DASD unit (block 72). The COLD data is placed in the COLD partition of a DASD unit with the greatest capacity (74). As discussed further below, the DASD unit is partitioned and the HOT partition of the DASD unit is defined as an area from which data access may be accomplished very quickly. A COLD partition is also defined for holding data which is very infrequently accessed. Therefore, preferably, HOT data will reside in the HOT partition of a underutilized DASD unit. Such a placement will allow the HOT data to be quickly accessed because the underutilized DASD unit is generally not frequently accessed by the system, and thus there will be little waiting on the underutilized unit to access the data. The COLD data, on the other hand, is placed in the COLD partition of a DASD unit with the greatest capacity. Generally, it will be desirable to spread the non-HOT data, such as the COLD data or the average data that is neither HOT nor COLD, over the various DASD units to avoid full DASD units while another unit is generally empty. In that way, the data, particularly the data that is early allocated, is spread over the various DASD units to even out the capacities over the various units. After the statistics gathering is complete, the program returns (block 90).

Partition DASD Units

Figure 4:
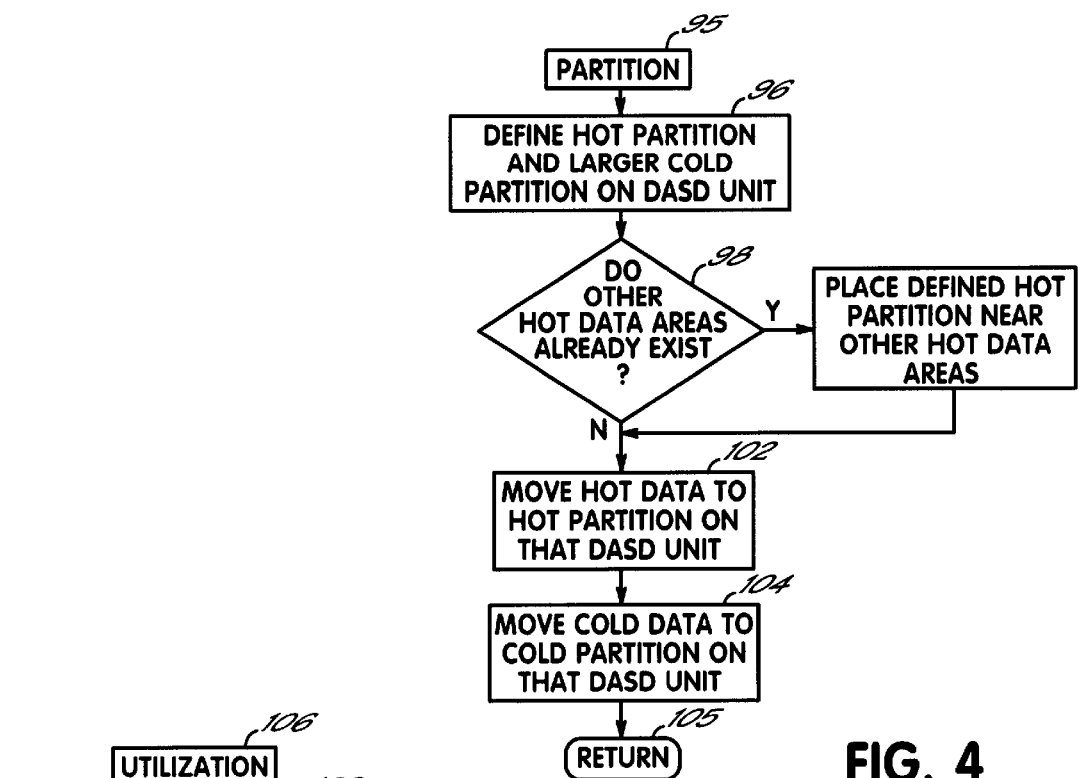
FIG. 4 is a schematic flowchart of a feature of the present invention.

Referring to FIG. 4, in defining the various partitions of the DASD units, a determination is made whether HOT data already exists on the unit.

Referring to FIG. 4, in the Partition process indicated by reference numeral 95, a DASD unit is divided into a HOT partition and a larger COLD partition (block 96). That is, various areas on a hard disk are designated as HOT areas for containing HOT data, and other areas are designated as COLD areas for containing COLD data. Other areas on the disk will not be designated either HOT or COLD partitions and thus will contain average data which is considered neither HOT nor COLD but which is accessed at an amount closer to the average access amount for the particular DASD unit or group of DASD units. A test is made to determine whether other HOT data areas already exist for the DASD unit (block 98). For example, the parity data on a DASD unit may be considered as HOT data. Since the parity area of the DASD unit and parity data is frequently accessed, it is generally positioned on the DASD unit to prevent a long seek time when that data is accessed. Accordingly, the HOT partition formed in accordance with the present invention may be placed or designated near the parity area of the DASD unit to thus minimize the seek time for all of the HOT data associated with a particular DASD unit. Therefore, the defined HOT partition is placed near other HOT data areas on the DASD (block 100). Next, all the HOT data identified with respect to a DASD unit is moved to the HOT partition (block 102) and the identified COLD data is moved to the COLD partition (block 104). The partition step then returns (block 105) for further movement and allocation of the data in accordance with the principles of the present invention.

Utilization Determination for DASD

Figure 5:
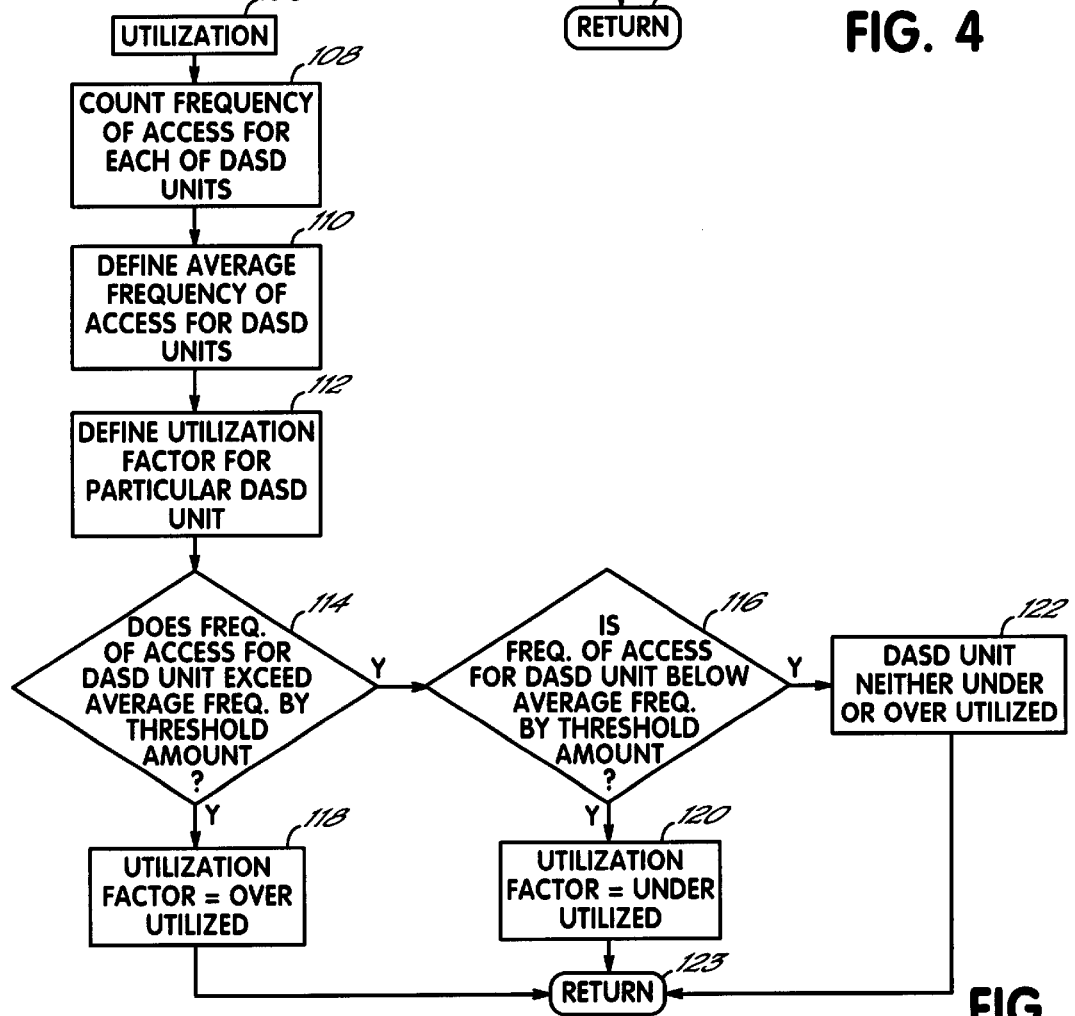
FIG. 5 is a schematic flowchart of a feature of the present invention.

Referring again to FIG. 3 and the Identify procedure 60, a determination must be made about whether a particular DASD unit is overutilized or underutilized. As noted in block 72, it is preferable to place HOT data in the HOT partition of an under-utilized DASD unit so that a bottleneck can be prevented when that HOT data is accessed. Underutilized DASD units have less of a wait time associated therewith when they are accessed. Referring to FIG. 5, the Utilization process 106 determines how frequently each DASD unit is accessed. Each DASD unit will then be assigned a utilization factor (UF) which indicates whether it is overutilized, underutilized, or utilized around the average utilization for the various DASD units of the system. To that end, the frequency of access for all the data on each DASD unit is counted (block 108). Generally within a system, a counter will be associated with the DASD unit that keeps track of the number of times that the DASD unit is accessed for data, that is, the number of times it is accessed to read or write data to the DASD unit. When all of the counts for the frequency of access for the various DASD units are obtained, an average frequency of access for the system is defined (block 110). Based upon the average frequency of access for the various DASD units of the system, the utilization factor, or UF, is defined for each particular DASD unit in the system (block 112).

Again, to prevent thrashing, as discussed further hereinbelow, a utilization threshold is determined with respect to the average frequency of access for the DASD units of the system to determine whether a DASD unit is overutilized, underutilized, or average. Such a threshold amount may be defined by the user with respect to a particular application and could be adjusted accordingly to increase or decrease the data movement. Alternatively, the threshold may be set for the entire system and hard-coded accordingly. A test is made to determine whether the frequency of access for a particular DASD unit exceeds the average frequency of access of the system by the utilization threshold amount (block 114). If it does, the utilization factor, or UF, is set to indicate an overutilized DASD unit (block 118). If not, a test is made to determine whether the frequency of access is below the average frequency by a threshold amount (block 116). If it is, then the utilization factor indicates that the DASD unit is underutilized (block 120). If it is neither overutilized nor underutilized, the DASD unit is considered average (block 122) and will generally be less involved in the movement of data at any particular time. It will be understood by a person of ordinary skill in the art that data as well as DASD utilization will change. HOT data may become COLD, and vice versa. Similarly, the DASD units may vary over time between overutilized, underutilized, or average. The Utilization process 106 will be called on a regular basis to constantly update the status of a particular DASD unit. For example, a unit may be considered overutilized or underutilized but then may receive certain portions of HOT data or COLD data which may change its status. For example, an underutilized DASD unit which is receiving a large amount of HOT data may become overutilized. Similarly, an overutilized DASD unit which is having HOT data taken therefrom, which is replaced with COLD data, may quickly become underutilized. Accordingly, the Utilization process 106 is preferably frequently used for updating the status of the various DASD units. Once the UF for a DASD unit has been determined under the Utilization process 106, the procedure returns (block 123).

Move Data

In accordance with another aspect of the invention, HOT and COLD data must be moved between various DASD units based upon their utilization factors. That is, data is moved based upon the access frequency of that specific data, as well as the access frequency of the DASD units in the system. As noted above, the utilization factor UF will be determined by the Utilization process 106 and each DASD will either be considered overutilized, underutilized, or average. With respect to the Move process 125, HOT data which is found in the COLD partition of a DASD unit is moved to the HOT partition on an underutilized DASD unit. In that way, the HOT data will be more readily available.

Figure 6:
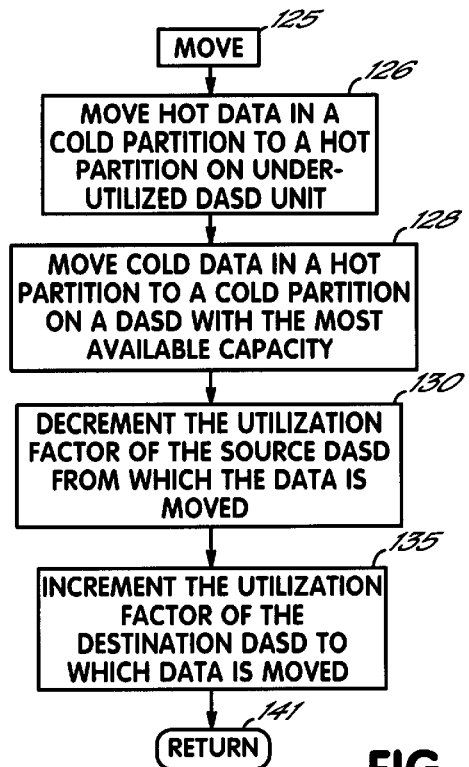
FIG. 6 is a schematic flowchart of a feature of the present invention.

The Move process, as illustrated in FIG. 6, will move any HOT data that exists in the COLD partition to a HOT partition in an underutilized DASD unit. For example, the HOT data may be moved to the HOT partition on the most underutilized DASD unit (block 126). As discussed above, the UF indication for a DASD unit will change through use of the Utilization process 106 to determine how frequently the DASD unit is accessed with respect to the average frequency of access. COLD data is also moved when it exists in a HOT partition. As noted in block 128, COLD data which is in a HOT partition is moved to a COLD partition on a DASD unit with the most available capacity. By moving COLD data to the DASD unit with the most available capacity, the spread of data over the various DASD units of a system is balanced so that a DASD unit with high capacity but little data thereon is avoided.

The movement of data also dynamically adjusts the Utilization Factor (UF) for the DASD unit to which the DASD unit is moved, and also the DASD unit from which the data originated. When HOT, frequently accessed data, is moved to a DASD unit, it will be appreciated that the DASD unit will now be accessed more frequently based upon that HOT data. To that end, the Move process 125 decrements the Utilization Factor (UF) of the source DASD from which the data is moved (block 130). The amount of the Utilization Factor (UF) of the source DASD is decremented is dependent upon whether the frequency of access information for the particular data being moved is available. The frequency of access information will be information that was gathered or a default value assigned when the data was created. The Utilization Factor (UF) will be decremented by the frequency of access amount associated with the data that is moved. Therefore, the source DASD unit which is providing the data and its Utilization Factor (UF) will be adjusted (decremented) accordingly. The Utilization Factor (UF) of the destination DASD which is receiving the data, must also be adjusted (incremented) to indicate that it contains data that will be accessed frequently (HOT data) or less frequently (COLD data). Therefore the Utilization Factor (UF) of the destination DASD unit is incremented when the data is moved (block 135). The Utilization Factor (UF) is incremented by the frequency of access amount associated with the data. The UF of the source DASD unit is decremented. After the data has been moved and the various Utilization Factors (UF) for the source and destination DASD units are incremented or decremented, the Move process 125 returns, which is indicated by block 141.

Sizing of Partitions

Figure 7:
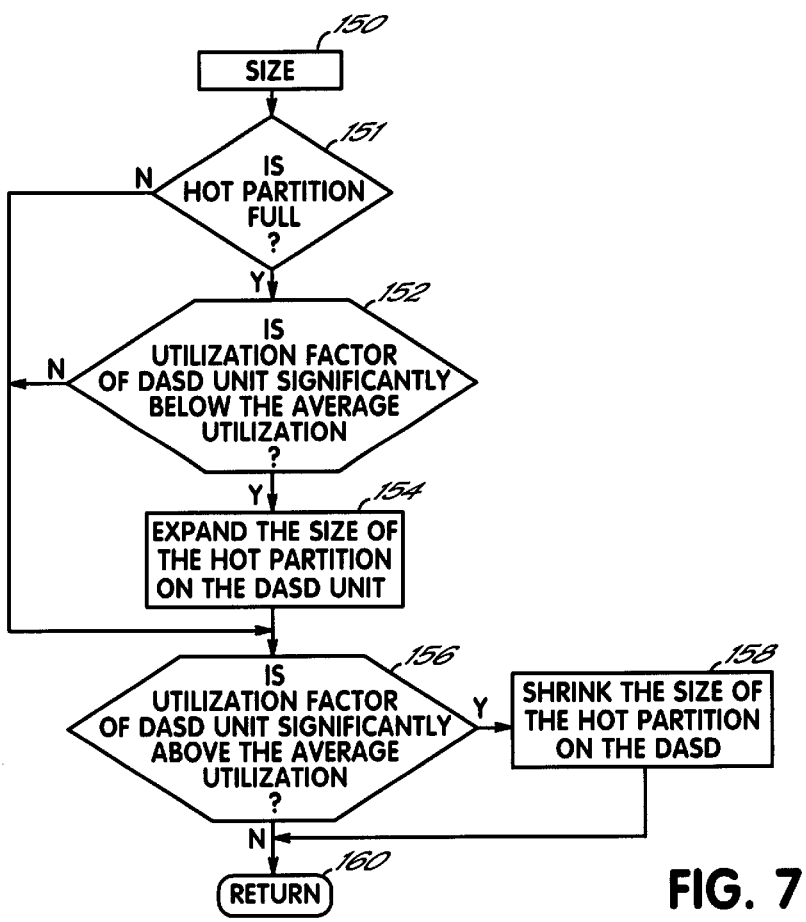
FIG. 7 is a schematic flowchart of a feature of the present invention.

In accordance with another aspect of the present invention, as shown in FIG. 7, the size of the partitions of the DASD units may be adjusted to address significant overutilization and significant underutilization. Referring to FIG. 7, the Size process 150 will test to determine whether the HOT partition for a particular DASD unit is full (block 151). If it is, a test is made to determine whether the Utilization Factor (UF) of the DASD unit is significantly below the average utilization (block 152). If it is, then the DASD unit is not operating efficiently, and would be able to handle more HOT data which is frequently accessed. If the Utilization Factor (UF) is significantly below the average utilization as indicated (block 152), then the size of the HOT partition on the DASD unit is expanded for receiving more HOT data (block 154). This allows the HOT data to be moved to an underutilized DASD unit for spreading utilization over the DASD units for more efficient system execution and to reduce bottlenecks. If the Utilization Factor (UF) of the DASD unit is not significantly below the average utilization, but rather is significantly above the average utilization as indicated by block 156, then the size of the HOT partition on the DASD unit is decreased in size to force HOT data to be moved off the overutilized DASD units (block 158). The decrease in size of the HOT partition is made until data is reached so that HOT data will be moved from the DASD. That is, you do not want to shrink the size of the HOT partition only to be shrinking into free space (no data) on the DASD. If the DASD unit is neither significantly below the average utilization or significantly above the average utilization as determined by its Utilization Factor (UF), then the Size process 150 simply returns (block 160) and the HOT partitions for the DASD unit are unaffected.

Prioritizing Requests

In addition to the DASD partitioning discussed above, requests for the data are dependent upon the priority of the job or task of the overall application in accordance with another aspect of the present invention. To that end, at execution of a particular program or application, jobs or tasks associated with the application are designated as high priority or low priority. Requests for HOT data from high priority jobs are handled first. Next, requests for COLD for a high priority job is handled. Not until all the data for the high priority job has been accessed will a request for HOT data for a low priority job be handled. Finally, the request for COLD data from a low priority job is handled. In that way, the priority of the job will dictate the data access and the designation of the requested data as HOT or COLD will also affect the prioritization of data access.

Possible User Controls

The partitioning of the invention could occur during execution or may be user controlled. To that end, a user may activate the DASD management and partitioning when the system's DASD units are creating a performance bottleneck. Once the DASD management and partitioning has optimized data placement to an acceptable performance level, the user could turn it off to eliminate any overhead. The user could then activate the DASD management and partitioning of the invention on some regular interval, such as once a month, to re-optimize data placement. During the data partitioning of the invention, statistics are gathered, such as a frequency of access of a DASD unit according to the Utilization process 106, or the frequency of access of a particular set of data according to the Identify process 60. Since such statistics gathering is important for system performance, the user could schedule the DASD management and partitioning invention to collect statistics for the times when the system performance is most critical. For example, a user may want to optimize a system performance during first shift interactive applications rather than off shift batch applications. Furthermore, as identified by the Move process 125 in FIG. 6, data must be moved during partitioning and optimization. To prevent data movement overhead during first shift interactive applications, the user may want to schedule the DASD partitioning to actually move the data during off shift batch applications based on the statistics that were earlier collected during the first shift applications.

The present invention provides DASD unit utilization that is equalized to prevent a particular DASD unit or units from being the bottleneck in the system performance. Furthermore, since HOT data is confined to HOT partitions and is positioned next to other HOT data such as parity data, the amount of time for each unit to seek for the access data is minimized. For example, with respect to a disk drive, the unit's arm moves a minimal distance from one piece of HOT data to another piece of HOT data during an access. Furthermore, by prioritizing requests, the requests for HOT data from high priority jobs are serviced first. With the HOT data confined to the HOT partition, the unit arm tends to stay in the HOT partition which minimizes the seek distance. Therefore, high priority jobs see a better response.

Another embodiment of the dynamic DASD management invention focuses upon less frequently accessed or COLD data that exists on a COLD DASD unit, that is, a DASD unit which has low utilization. The COLD data is moved to a HOT DASD unit or high utilization unit. Such an embodiment of the invention provides several benefits. First, there is not a great effect on the utilization of the receiving DASD unit, because the COLD data that is moved thereto is unlikely to be referenced much in the near future. The COLD DASD units from which the data was moved (i.e., the sending units) have a greater percentage of free space thereon while the receiving units or HOT units now have a lower percentage of free space. This percentage shifting of the free space on the DASD units in a system causes any new data to be allocated to the DASD units from which the data was moved, that is, to the sending units, which are COLD units. Since newly allocated data is generally expected to be highly referenced, or HOT data, the utilization of the COLD DASD units is likely to increase. Similarly, the utilization of the HOT units is likely to be decreased. In that way, the data is more evenly distributed among the DASD units in the system, thus reducing system bottlenecks. Other advantages of this embodiment of the invention are discussed further hereinbelow.

Figure 8:
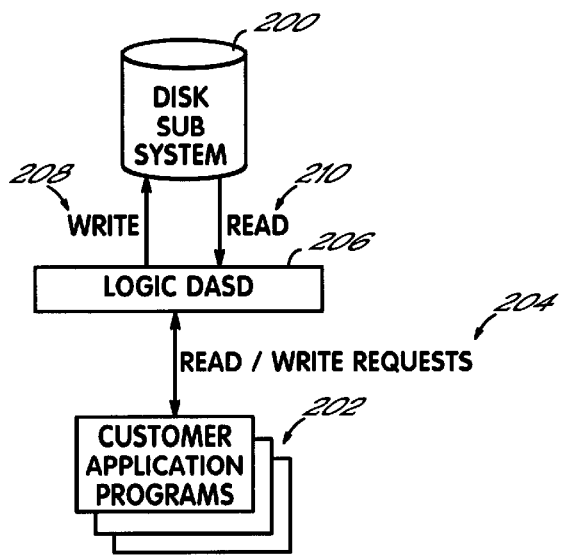
FIG. 8 is a schematic diagram of a DASD unit of the present invention.

Referring to FIG. 8, a schematic software diagram illustrates the interfacing between a customer's application programs and the DASD units within a system, in accordance with the principles of the invention. One popular DASD unit is a hard disk drive and thus disk drive units are utilized for illustrative purposes. A DASD unit, such as disk subsystem 200, interfaces with customer application programs 202 wherein data is read and written to the DASD (disk) unit 200. Read and write requests 204 are issued by the customer application programs 202. Software code, entitled LOGICAL DASD 206 provides the interface between the disk subsystem 200 and the programs 202. The disk subsystem (DASD) 206 will generally consist of an I/O processor which is separate from the system processor and disk drive device.

The LOGICAL DASD code 206 runs within the system processor of the system that interfaces with the programs 202. The code 206 directs and controls the input/output I/O requests that are being targeted to the disk subsystem 200 by the application programs 202. Upon a read/write request 204 from the programs 202, the code 206 writes to the disk subsystem, as indicated by reference numeral 208, or reads from the system, as indicated by reference numeral 210. There is a 1:1 correlation between the LOGICAL DASD code 206 and the disk subsystem 200. Therefore, for each disk subsystem (i.e., each DASD) there exists a LOGICAL DASD object 206.

Figure 9:
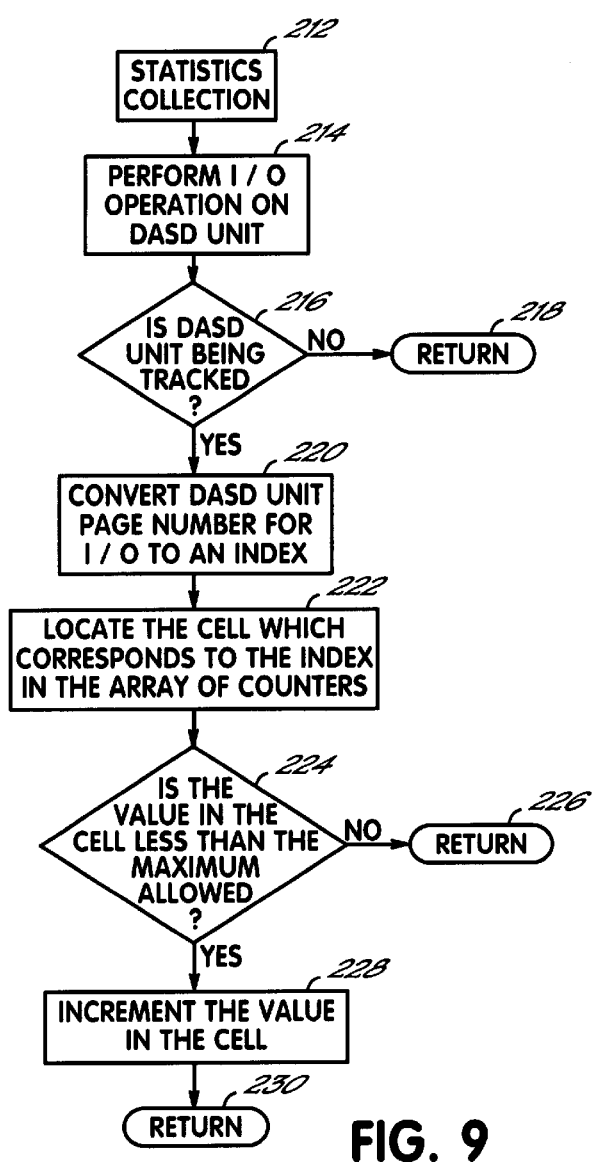
FIG. 9 is a schematic flow chain of a feature of the present invention.

Similar to the embodiments previously discussed, the alternative embodiment referenced in FIGS. 8–11 utilizes essentially two phases of operation. The first phase broadly includes a collection of statistical information for each DASD unit and the data on the DASD units. The second phase includes management of the data for which statistics were collected, including movement of that data among the various DASD units. FIG. 9 is a flow chart illustrating a statistics collection routine 212 in accordance with the principles of the present invention. The statistics collected for the data on a DASD unit and for the unit itself are based upon I/O operations that are performed on that DASD unit (block 214). Therefore, statistics collection 212 monitors the I/O operations. For each I/O operation, a determination is made about whether the particular DASD unit is being tracked for statistics collection (block 216). If it is not, the program returns (block 218) and no statstics are gathered for that DASD unit. The LOGICAL DASD 206 monitors the read and write commands (I/O operations) being issued to the DASD unit. Each time an I/O operation is sent to a DASD unit, the LOGICAL DASD 206 converts the page/sector number of the I/O operation into an index value (block 220). That index value is then linked to a counter. The LOGICAL DASD 206 sends a message to a resident task (COLLECTOR 264) which has access to an array of counters, wherein each element or counter is referred to as a cell. There is an array of counters for each DASD unit, and each portion of the DASD unit has its own counter. The counters or cells are accessed by their index numbers. Accordingly, the cell (individual counter) which corresponds to the index (i.e., the page/sector number for DASD unit) is located in the array of counters (block 222). The array of counters will generally be resident in the system's main memory. A test is then made to determine whether the value in the particular cell is less than the maximum value allowed for that cell (block 224). If it is not, the system returns (block 226). An error, or some other message may be indicated to the system user upon the cell count being greater than the maximum value. If the cell value is less than the maximum value allowed, the value in the cell is incremented for the particular I/O operation (block 228). The statistics collection routine then returns (block 230).

As an example, in the implementation discussed above, each cell or counter corresponding to a DASD unit actually corresponds to one megabyte of disk storage, as noted by a page number for the DASD unit. The page/sector number for each I/o operation that occurs is converted to the index, and therefore, the index represents the one-megabyte area on the disk where the I/O operation will be performed. If a read operation is performed, for example, on page 0x400, the page number (0x400) is converted to a suitable index value (e.g., 4). The cell or counter for that index value is then incremented to indicate that an I/O operation has occurred for that particular one-megabyte area of the DASD unit. That is, each portion of the disk has a counter that will be incremented if there is corresponding I/O associated with that disk portion. In that way, the array of counters is Utilized to count the quantity of 110 accesses for each segment of the DASD unit being monitored or tracked for statistics. The one-megabyte sections of the DASD units being monitored is utilized only for illustrative purposes. Other larger or smaller size segments might be utilized and assigned a particular cell for counting I/O operations for those segments.

Figure 10:
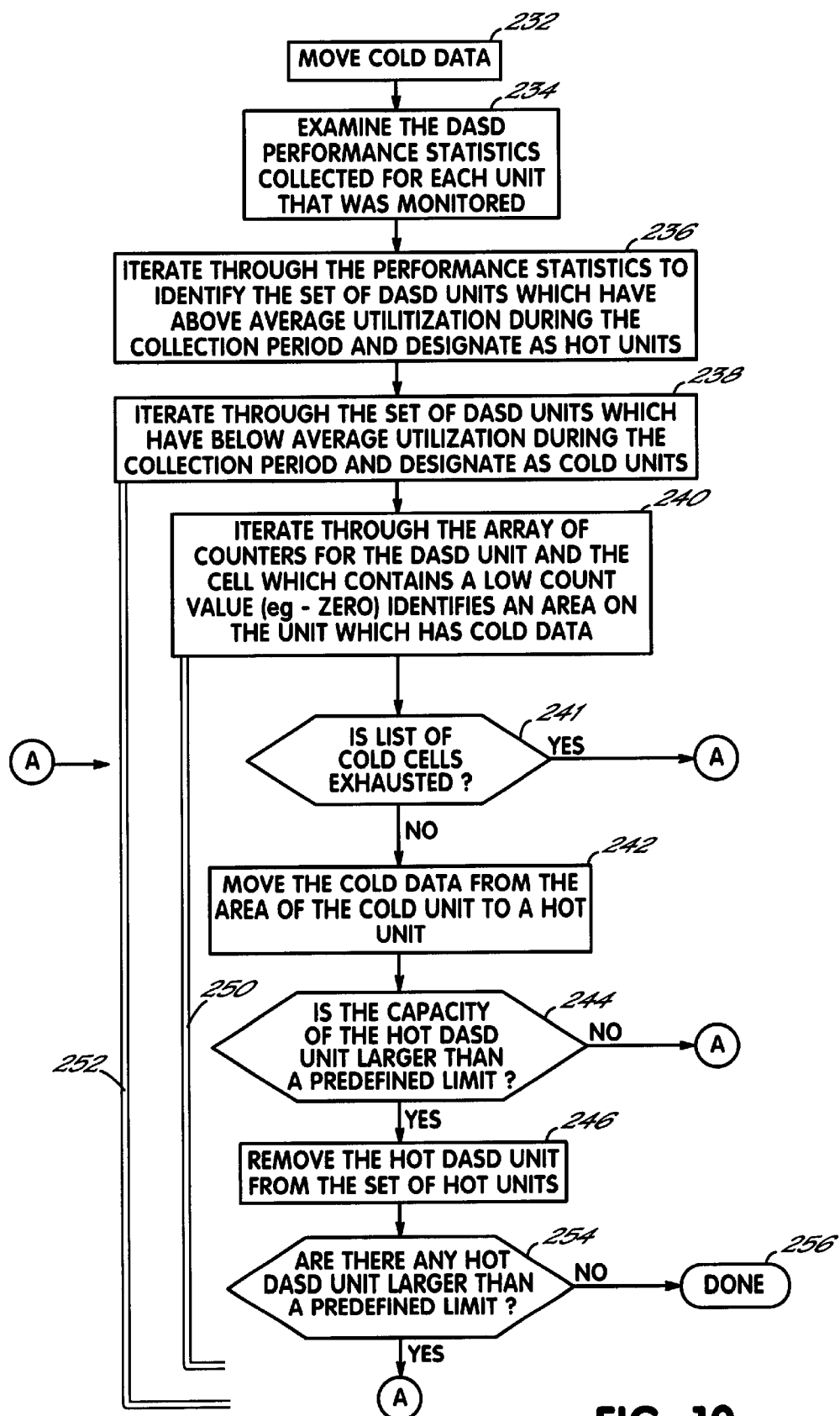
FIGS. 10 is a schematic flowchart of the present invention.

There is a data management phase of the invent on, in which data is moved and balanced among the various DASD units of a system. FIGS. 10 is a software flowchart for one suitable routine for data management consistent with the embodiment of the present invention. The routine is designated Move COLD Data (block 232). It begins by examining the DASD performance statistics which were collected for each of the units being monitored pursuant to the statistics collection routine 212, as illustrated in FIG. 9. The statistics are located in the various cells of the array of counters. Utilizing the various performance statistics, the routine then iterates through those statistics to identify the set of DASD units which have above average utilization during the collection period (block 236). Those units with above average utilization or high utilization may be designated as HOT units. As discussed hereinabove with earlier disclosed embodiments, the recognition of DASD units as HOT or COLD may be done utilizing threshold utilization amounts which exceed or are below average utilization amounts. As such, not all units may be HOT or COLD, but only those that are on either side of a particular threshold deviation from the average utilization amount.

Next, as illustrated in block 238, the routine iterates through the DASD units which have below average utilization or low utilization, and those units may be designated as COLD units. Upon determining a COLD unit, the routine iterates the array of counters for the DASD units to examine the cells corresponding to portions of data on the unit. The cell which contains a low count value, for example, 0 (zero), identifies an area on the DASD unit which contains less frequently accessed data or COLD data (block 240). Cold data or less frequently accessed data may be designated as any data that is not accessed at all (i.e. zero count) during a predetermined period or that data which is accessed at a count below some defined threshold during that period. A test is made (block 241) during the iteration through the array of counters to determine if the list of COLD cells for a particular DASD unit is exhausted. If not, the COLD data is moved. If the list is exhausted, the iterative loop ends, as shown by reference letter A, and the next DASD unit of the set is explored for COLD data (block 240). Upon locating the COLD data, the COLD data is then moved from the particular area on the COLD or underutilized unit to a HOT or overutilized unit which was identified according to block 236 above (block 242). The COLD data from the COLD unit will be moved to the HOT unit up to a certain capacity limit on the HOT DASD un it (block 244). If the capacity of the HOT DASD unit is larger than a predefined limit, then the DASD unit is not suitable for receiving additional COLD data and thus the HOT DASD unit is removed from the available set of HOT units to which COLD data may be moved or shifted (block 246). If a particular HOT DASD unit is not above a predefined capacity limit, then COLD data will continue to be moved as illustrated by reference letter A.

The reference numerals 250 and 252 illustrate loops within the flowchart of FIG. 10 where in COLD data of a COLD DASD unit will be moved to the available HOT DASD unit, as long as that HOT DASD unit does not become too full (block 244). All the data for a particular COLD data unit is moved, as illustrated by loop 250, then the routine moves onto the next COLD DASD unit and moves all of the COLD data associated therewith, as illustrated by loop 252. As noted above, if COLD data is being moved and the HOT DASD unit fills up (block 244), the HOT DASD unit is no longer available (block 246), and a test is made to determine whether there are any HOT DASD units remaining in the set of DASD units being handled in accordance with the principles of the present invention (block 254). If no HOT DASD units are available, then the routine is done (block 256). However, if any units remain, the loops 250 and 252 will continue as illustrated by the YES decision to block 254 and reference letter A, until all of the COLD data has been moved for all the COLD units in the system or until there are no longer any available HOT units to which the data might be moved.

As noted above, the COLD DASD units from which the data is moved now have a greater percentage of free space. As such, any newly allocated data, which is expected to be highly referenced (or HOT data), will be moved to low utilization drives which will improve performance and prevent bottlenecks within the system. Furthermore, by filling HOT DASD units with COLD data, new HOT data will not be allocated thereto, thus effectively decreasing the utilization of a high utilization or HOT DASD unit.

Figure 11:
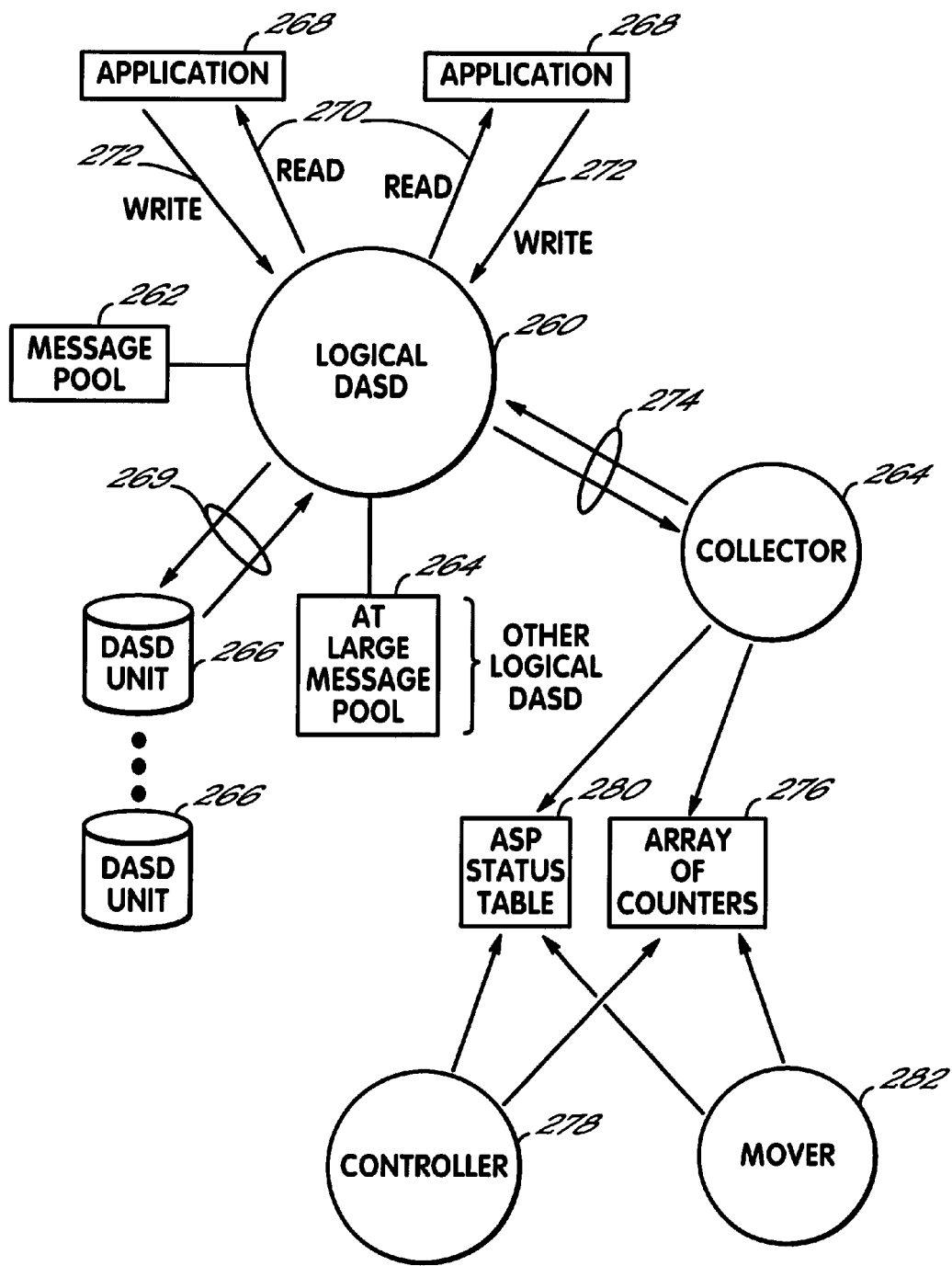
FIG. 11 is a schematic diagram of a software configuration consistent with the invention.

FIG. 11 illustrates a software object diagram of one possible software implementation of data management in accordance with the principles of the present invention, as illustrated FIGS. 8, 9, 10A and 10B. For each DASD unit, such as a hard disk, which exists within a system, there will be a LOGICAL DASD object 260 associated therewith. LOGICAL DASD object 260 utilizes a message pool or queue 262. The message pool 262 holds messages which are used by the LOGICAL DASD object 260 to communicate with a COLLECTOR object which is a task to collect statistics regarding a particular DASD unit as discussed further hereinbelow. LOGICAL DASD object 260 also utilizes an "at-large" or common message pool which may be accessed by all LOGICAL DASD objects of the system when the message pool 262 for a particular LOGICAL DASD is depleted.

The LOGICAL DASD object 260 includes a method for tracking the I/O operations of the DASD unit 266. Upon invoking the tracking method, the method tells the LOGICAL DASD object 260 to monitor the DASD unit 266 for read/write commands as evidenced collectively by reference numeral 269. As discussed above, customer application programs 268 interface to the DASD unit 266 through the LOGICAL DASD object 260 interface wherein read requests 270 and write requests 272 from the application programs are translated into read and write operations 269 on the DASD unit 266. Pursuant to the tracking method of the LOGICAL DASD object 260, whenever a read or write command is received from the application programs 268, a message is taken from the message pool or queue 262 and the specific page number for the DASD unit is incorporated into the message. The message is then sent to the COLLECTOR object 264 to be handled, as indicated by reference numeral 274. The COLLECTOR object, which is a task, is preferably associated with each system being monitored. Therefore, the COLLECTOR object 264 processes messages from a plurality of LOGICAL DASD objects 260 and corresponding DASD units. That is, the COLLECTOR object 264 handles a plurality of DASD units 266 through their LOGICAL DASD objects 260. The COLLECTOR receives the queued message 274 from the LOGICAL DASD object 264, wherein the message contains information regarding the disk unit number and also the page of the disk unit that the I/O operation is being performed upon.

The COLLECTOR object 264 converts the page number of the I/O operation to an index number and finds the particular cell associated with that index. To that end, COLLECTOR object 264 interfaces with an array of counters 276, which is a reserved segment of memory for tracking the I/O counts for a DASD unit 266 and the counts for each sector or page on the DASD unit which is being accessed through I/O operations. Therefore, an array of counters 276 exists for each DASD unit 266 of the system. The array of counters 276, in addition to the individual sells for the I/O counts, will contain information about the particular DASD unit 266 including the unit number assigned thereto, the total number of I/O operation counts for the unit, and the quantity of pages or stripes on the unit. As discussed above, one embodiment of the invention might utilize one megabyte disk stripes; however, various other disk stripe sizes might be utilized for counting I/O operations. Upon receiving a message 274 from the LOGICAL DASD object 260, COLLECTOR 264 will increment the appropriate cell in the array of counters 276 which corresponds to the page of the particular DASD unit 266 in which the I/O operation occurred.

COLLECTOR 264 utilizes a CONTROLLER object 278 which is a resident task. It controls the operation of the data management through the other objects by controlling the tracking method for each LOGICAL DASD object 260 which is a designated unit for data in a selected auxiliary storage pool (ASP) of data. That is, the CONTROLLER will determine which DASD units 266 are associated with a particular or selected ASP of data, and which units 266 will be engaged for collecting statistics. The data is then moved between DASD units in accordance with the dynamic data management principles of the invention. The CONTROLLER object 278 also associates a particular array of counters 276 with a LOGICAL DASD object 260. The CONTROLLER object 278 also clears the array of counters 276 when necessary. Furthermore, as discussed further hereinbelow, the CONTROLLER object 278 interfaces with an ASP status table 280 to determine the status for each ASP for which data will be collected. That is, the CONTROLLER object 278 will administer collection of statistics and management of the data in accordance with the principles of the invention, depending upon the status of a particular ASP. The CONTROLLER object 278 will also clear the array of counters 276 when necessary to begin a new statistics collection for a particular DASD.

The ASP status table is a reserve segment of memory for each particular ASP of data for which data management will occur. Suitable ASP statuses may be the following, for example: running the collection, cancelling the collection, moving data, cancelling the move data, holding collection data, and not running. That is, the status of the CONTROLLER object 278, as determined by the status for each ASP in table 280, will either be running a collection of statistics, cancelling the collection of statistics, or holding the collection data that has been accumulated through the completed collection. CONTROLLER 278 will also determine whether the data is being moved, or whether a move will be cancelled.

The object MOVER 282 handles the actual movement of data, based upon the utilization of the DASD units within a particular ASP, as well as the status of the data for which statistics were collected, as discussed above. The MOVER object 282 will compute the average and standard deviation for each DASD unit 266 in a particular ASP and will determine which units are above average in utilization or high utilization (HOT units) and which units are below average in utilization (COLD units) or low utilization. In accordance with the principles of the present invention as discussed above, the MOVER object 282 will loop through the various COLD units and move COLD data therefrom to HOT DASD units. Therefore, for any given ASP, the invention could be collecting statistics, moving data, or neither, generally independent of the other ASPs whose data is being dynamically managed pursuant to the invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method of managing data on DASD units to improve system performance comprising:

monitoring portions of data on a plurality of DASD units and determining the number of times that portions of data on the DASD units are accessed within a given time period;

characterizing frequently accessed data portions of a DASD unit as HOT data and characterizing less frequently accessed data portions of the DASD unit as COLD data;

monitoring the DASD units to determine the number of times each unit is accessed within a time period and assigning utilization factors to the DASD units which are reflective of the number of times each DASD unit is accessed during the time period;

moving HOT and COLD data between DASD units based on the utilization factors of the DASD units.

2. The method of claim 1 further comprising determining the capacities of DASD units and moving COLD data between DASD units based on said capacities.

3. The method of claim 2 further comprising moving COLD data to a DASD unit with available capacity.

4. The method of claim 1 further comprising moving HOT data to a DASD unit with a low utilization factor.

5. The method of claim 1 further comprising:

partitioning the DASD units to have HOT partitions and COLD partitions; and moving HOT data to a HOT partition and COLD data to a COLD partition of a DASD unit.

6. The method of claim 5 further comprising:

determining an average utilization factor for the DASD units being monitored;

expanding the HOT partition of a DASD unit having a utilization factor below the average utilization factor by a utilization threshold amount.

7. The method of claim 6 further comprising reducing the HOT partition of a DASD unit having a utilization factor exceeding the average utilization factor by a utilization threshold amount.

8. The method of claim 5 wherein said HOT partition of a DASD unit is smaller than the COLD partition.

9. The method of claim 1 further comprising adjusting the utilization factors of the respective DASD units as the data is moved between the devices.

10. The method of claim 9 wherein the utilization factor of a DASD unit receiving data is increased.

11. The method of claim 9 wherein the utilization factor of a DASD unit sending data is decreased.

12. The method of claim 1 further comprising:

determining an average utilization factor for the DASD units being monitored;

if the utilization factor of a DASD unit exceeds the average utilization factor by an upper threshold amount, categorizing the DASD unit as highly utilized with a high utilization factor; and if the utilization factor of a DASD unit is below the average utilization factor by a lower threshold amount, categorizing the DASD unit as under utilized with a low utilization factor.

13. The method of claim 1 further comprising:
   determining an average frequency of access within the time period for portions of data;
   characterizing a frequently accessed data portion of a DASD unit as HOT data if the frequency of access of the portion exceeds the average frequency of access by an upper frequency threshold; and
   characterizing a less frequently accessed data portion of a DASD unit as COLD data if the frequency of access of the portion is below the average frequency of access by a lower frequency threshold.

14. The method of claim 1 further comprising, upon creation of data on a DASD, designating the data as one of HOT and COLD data.

15. A method of managing data on DASD units to improve system performance comprising:
   monitoring portions of data on a DASD unit and determining the number of times that the portions of data on the DASD unit are accessed within a given time period;
   characterizing frequently accessed data portions of a DASD unit as HOT data and characterizing less frequently accessed data portions of the DASD unit as COLD data;
   partitioning the DASD unit to have a HOT partition and a COLD partition; and
   on the DASD unit, moving HOT data to a HOT partition and COLD data to a COLD partition.

16. The method of claim 15 further comprising:
   monitoring DASD units to determine the number of times each unit is accessed within a time period and assigning a utilization factor to a DASD unit which is reflective of the number of times the DASD unit is accessed during the time period;
   determining an average utilization factor for the DASD units being monitored;
   expanding the HOT partition of a DASD unit having a utilization factor below the average utilization factor by a utilization threshold amount.

17. The method of claim 16 further comprising reducing the HOT partition of a DASD unit having a utilization factor exceeding the average utilization factor by a utilization threshold amount.

18. The method of claim 16 further comprising forming the HOT partition of the DASD unit close to other HOT data on the DASD unit.

19. The method of claim 16 further comprising, upon creation of data on a DASD, designating the data as one of HOT and COLD data.

20. The method of claim 16 further comprising:
   determining an average frequency of access within the time period for portions of data;
   characterizing a frequently accessed data portion of a DASD unit as HOT data if the frequency of access of the portion exceeds the average frequency of access by an upper frequency threshold; and
   characterizing a less frequently accessed data portion of a DASD unit as COLD data if the frequency of access of the portion is below the average frequency of access by a lower frequency threshold.

21. An apparatus for managing data on DASD units to improve system performance comprising:
   a memory;
   a program resident in memory and configured to characterize frequently accessed data portions of a DASD unit as HOT data and less frequently accessed data portions of the DASD unit as COLD data, the program further configured to assign utilization factors to the DASD units which are reflective of the number of times each DASD unit is accessed during a time period and to move HOT and COLD data between DASD units based on the utilization factors of the DASD units.

22. The apparatus of claim 21 wherein the program is further configured to determine the capacities of DASD units and to move COLD data between DASD units based on said capacities.

23. The apparatus of claim 22 wherein the program is further configured to move COLD data to a DASD unit with available capacity.

24. The apparatus of claim 21 wherein the program is further configured to move HOT data to a DASD unit with a low utilization factor.

25. The apparatus of claim 21 wherein the program is further configured to partition the DASD units to have HOT partitions and COLD partitions and to move HOT data to a HOT partition and COLD data to a COLD partition of a DASD unit.

26. The apparatus of claim 25 wherein the program is further configured to make said HOT partition of a DASD unit smaller than the COLD partition.

27. The apparatus of claim 21 wherein the program is further configured to determine an average utilization factor for the DASD units being monitored and to expand the HOT partition of a DASD unit having a utilization factor below the average utilization factor by a utilization threshold amount.

28. The apparatus of claim 21 wherein the program is further configured to reduce the HOT partition of a DASD unit having a utilization factor exceeding the average utilization factor by a utilization threshold amount.

29. The apparatus of claim 21 wherein the program is further configured to adjust the utilization factors of the respective DASD units as the data is moved between the devices.

30. The apparatus of claim 29 wherein the program is further configured to increase the utilization factor of a DASD unit receiving data.

31. The apparatus of claim 29 wherein the program is further configured to decrease the utilization factor of a DASD unit sending data.

32. The apparatus of claim 21 wherein the program is further configured to determine an average utilization factor for the DASD units being monitored, and if the utilization factor of a DASD unit exceeds the average utilization factor by an upper threshold amount, to categorize the DASD unit as highly utilized with a high utilization factor; and
   if the utilization factor of a DASD unit is below the average utilization factor by a lower threshold amount, to categorize the DASD unit as under utilized with a low utilization factor.

33. The apparatus of claim 21 wherein the program is further configured to determine an average frequency of access within the time period for portions of data and to characterize a frequently accessed data portion of a DASD unit as HOT data if the frequency of access of the portion exceeds the average frequency of access by an upper frequency threshold, and to characterize a less frequently accessed data portion of a DASD unit as COLD data if the frequency of access of the portion is below the average frequency of access by a lower frequency threshold.

34. The apparatus of claim 21 wherein the program is further configured, upon creation of data on a DASD, to designate the data as one of HOT and COLD data.

35. An apparatus for managing data on DASD units to improve system performance comprising:

a memory;

a program resident in memory and configured to characterize frequently accessed data portions of a DASD unit as HOT data and less frequently accessed data portions of the DASD unit as COLD data, the program further configured to partition the DASD unit to have a HOT partition and a COLD partition and, on the DASD unit, to move HOT data to a HOT partition and COLD data to a COLD partition.

36. The apparatus of claim 35 wherein the program is further configured to monitor DASD units for determining the number of times each unit is accessed within a time period and to assign a utilization factor to a DASD unit which is reflective of the number of times the DASD unit is accessed during the time period, the program further configured to determine an average utilization factor for the DASD units being monitored and to expand the HOT partition of a DASD unit having a utilization factor below the average utilization factor by a utilization threshold amount.

37. The apparatus of claim 36 wherein the program is further configured to reduce the HOT partition of a DASD unit having a utilization factor exceeding the average utilization factor by a utilization threshold amount.

38. The apparatus of claim 36 wherein the program is further configured to form the HOT partition of the DASD unit close to other HOT data on the DASD unit.

39. The apparatus of claim 36 wherein the program is further configured, upon creation of data on a DASD, to designate the data as one of HOT and COLD data.

40. The apparatus of claim 36 wherein the program is further configured to determine an average frequency of access within the time period for portions of data and to characterize a frequently accessed data portion of a DASD unit as HOT data if the frequency of access of the portion exceeds the average frequency of access by an upper frequency threshold, and to characterize a less frequently accessed data portion of a DASD unit as COLD data if the frequency of access of the portion is below the average frequency of access by a lower frequency threshold.

41. A program product for managing data on DASD units to improve system performance, the program product comprising:

a program configured to characterize frequently accessed data portions of a DASD unit as HOT data and less frequently accessed data portions of the DASD unit as COLD data, the program further configured to assign utilization factors to the DASD units which are reflective of the number of times each DASD unit is accessed during a time period and to move HOT and COLD data between DASD units based on the utilization factors of the DASD units;

a signal bearing media bearing the program.

42. The program product of claim 41 wherein the signal bearing media is a transmission media.

43. The program product of claim 41 wherein the signal bearing media is recordable media.

44. A program product for managing data on DASD units to improve system performance, the program product comprising:

a program configured to characterize frequently accessed data portions of a DASD unit as HOT data and less frequently accessed data portions of the DASD unit as COLD data, the program further configured to partition the DASD unit to have a HOT partition and a COLD partition and, on the DASD unit, to move HOT data to a HOT partition and COLD data to a COLD partition;

a signal bearing media bearing the program.

45. The program product of claim 44 wherein the signal bearing media is a transmission media.

46. The program product of claim 44 wherein the signal bearing media is recordable media.

47. A method of managing data on DASD units to improve system performance comprising:

monitoring portions of data on a plurality of DASD units for determining the number of times that the portions of data are accessed within a predetermined time period;

characterizing less frequently accessed data as COLD data;

monitoring the utilization of individual DASD units of a plurality of DASD units to determine under-utilized units and over-utilized units;

moving the COLD data to DASD units that are over-utilized.

48. The method of claim 47 wherein the COLD data being moved is from a DASD unit which is under-utilized.

49. The method of claim 47 wherein said less frequently accessed data has not been accessed within said predetermined time period.

50. The method of claim 47 wherein said monitoring includes counting the number of I/O operations for portions of data to determine the number of times that the data portions are accessed in the predetermined time period.

* * * * *